United States Patent
Ostrowski et al.

(10) Patent No.: US 7,968,754 B2
(45) Date of Patent: Jun. 28, 2011

(54) METHOD FOR PRODUCING POLYETHER ALCOHOLS

(75) Inventors: Thomas Ostrowski, Mannheim (DE); Raimund Ruppel, Mannheim (DE); Eva Baum, Dresden (DE); Kathrin Harre, Dresden (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 851 days.

(21) Appl. No.: 10/578,874

(22) PCT Filed: Nov. 6, 2004

(86) PCT No.: PCT/EP2004/012598
§ 371 (c)(1),
(2), (4) Date: May 11, 2006

(87) PCT Pub. No.: WO2005/047365
PCT Pub. Date: May 26, 2005

(65) Prior Publication Data
US 2007/0129577 A1    Jun. 7, 2007

(51) Int. Cl.
*C07C 41/03*    (2006.01)
(52) U.S. Cl. .................. 568/618; 568/619; 568/620
(58) Field of Classification Search .................. None
See application file for complete search history.

(56) References Cited

U.S. PATENT DOCUMENTS

| | | |
|---|---|---|
| 5,777,177 A | 7/1998 | Pazos |
| 6,359,101 B1 | 3/2002 | O'Connor et al. |
| 6,486,361 B1 | 11/2002 | Ehlers et al. |
| 6,491,846 B1 | 12/2002 | Reese, II et al. |
| 2002/0193245 A1 | 12/2002 | Dexheimer et al. |

FOREIGN PATENT DOCUMENTS

| | | |
|---|---|---|
| DE | 203 734 | 11/1983 |
| DE | 203 735 | 11/1983 |
| EP | 0 659 798 | 6/1995 |
| WO | 97/29146 | 8/1997 |
| WO | 98/03571 | 1/1998 |

*Primary Examiner* — Rosalynd Keys
(74) *Attorney, Agent, or Firm* — Oblon, Spivak, McClelland, Maier & Neustadt, L.L.P.

(57) ABSTRACT

The invention relates to a process for the continuous preparation of polyether alcohols by reaction of alkylene oxides with H-functional starter substances in the presence of DMC catalysts, which comprises, at the beginning of the process
a) firstly placing initial charge material and DMC catalyst in a reactor,
b) metering in alkylene oxide so that the metering rate which is maintained for continuous operation of the reactor is reached in a time of from 100 to 3000 seconds,
c) metering in starter substance during or after step b) so that the metering rate which is maintained for continuous operation of the reactor is reached in a time of from 5 to 500 seconds,
d) after the fill level in the reactor which is desired for continuous operation of the reactor has been reached, taking product off continuously from the reactor while at the same time metering in starter substance and alkylene oxides in such an amount that the fill level in the reactor remains constant and metering in DMC catalyst so that the catalyst concentration necessary for continuous operation of the reactor is maintained in the reactor.

11 Claims, No Drawings

METHOD FOR PRODUCING POLYETHER ALCOHOLS

The present invention relates to a process for preparing polyether alcohols using multimetal cyanide compounds as catalysts.

Polyether alcohols are important starting materials in the production of polyurethanes. They are usually prepared by catalytic addition of lower alkylene oxides, in particular ethylene oxide and/or propylene oxide, onto H-functional starters.

Catalysts used are usually soluble basic metal hydroxides or salts, with potassium hydroxide having the greatest industrial importance. A disadvantage of the use of potassium hydroxide as catalyst is, in particular, that formation of unsaturated by-products occurs in the preparation of high molecular weight polyether alcohols and these by-products reduce the functionality of the polyether alcohols and have a very adverse effect in the production of polyurethanes.

To reduce the content of unsaturated components in the polyether alcohols and increase the reaction rate in the addition reaction of propylene oxide, it has been proposed that multimetal cyanide compounds, preferably double metal cyanide compounds, in particular zinc hexacyanometalates, be used as catalysts. These catalysts are frequently also referred to as DMC catalysts. There is a large number of publications in which such compounds are described.

The polyether alcohols prepared using multimetal cyanide compounds have a very low content of unsaturated constituents. A further advantage of the use of multimetal cyanide compounds as catalysts is the significantly increased space-time yield in the addition reaction of the alkylene oxides.

The preparation of polyetherols using DMC technology can be carried out both in batch processes and in continuous processes.

Continuous processes for preparing polyether alcohols using DMC catalysts are known. Thus, DD 203 735 describes a process for the continuous preparation of polyether alcohols using DMC catalysts, in which a starter substance containing an activated DMC catalyst is metered continuously into a tube reactor, alkylene oxide is added one or more times along the tube reactor and the finished polyether alcohol is taken off continuously at the end of the reactor. In this process, the activated starter substance has to be produced in a separate process step in another reactor.

DD 203 734 describes a process for preparing low molecular weight alkylene oxide addition products containing an activated DMC catalyst. In this process, the catalyst is firstly activated by means of alkylene oxide and, after the reaction has started, alkylene oxide and low molecular weight alcohol are metered into the reactor until the desired molecular weight has been reached.

WO 97/29146 describes a process for preparing polyether alcohols using DMC catalysts, in which the addition of alkylene oxides onto the H-functional starter substance is started in a reactor and further starter substance and alkylene oxide are metered continuously into this reacting mixture. The finished polyether alcohol is taken from the reactor after the addition reaction.

WO 98/03571 describes a process for the continuous preparation of polyether alcohols using DMC catalysts. Here, starter substance and alkylene oxide are fed continuously into a continuously operating reactor and the finished polyether alcohol is taken off continuously.

In all cases, it is difficult to start the reaction and establish steady-state conditions in the reactor owing to the strongly exothermic nature of the reaction.

As starter substances, it is possible to use either alcohols or alkoxylates of alcohols. In the case of low molecular weight alcohols such as glycerol, trimethylolpropane, propylene glycol, dipropylene glycol, ethylene glycol, diethylene glycol, sorbitol, tridecanol-N, poisoning of the catalyst by the low molecular weight starters can occur in the initial phase of the reaction. If relatively high molecular weight starters are used, in particular those having molar masses above 300 g/mol, damage to the catalyst can likewise occur, especially as a result of thermal stress during the commencement of the reaction.

If the low molecular weight alcohols are metered continuously into the reactor, poisoning of the catalyst has to be suppressed. This is particularly important when small amounts of DMC catalyst are employed.

It is an object of the present invention to configure the start-up of continuous reactors for the preparation of polyether alcohols by addition of alkylene oxides onto H-functional starter substances in such a way that steady-state operation of the reactor can be established quickly without deactivation of the catalyst occurring, even when using low catalyst concentrations.

We have found that this object is achieved by placing an initial charge material and DMC catalyst in the reactor at the beginning of the reaction, running alkylene oxide into this in a defined time up to the metering rate which is maintained during continuous operation of the reactor, after this metering rate has been achieved or in parallel to the metered addition of alkylene oxide, running in starter substance in a defined time up to the metering rate which is maintained during continuous operation of the reactor. The metered addition of the alkylene oxides and the starter substance from the start of the reaction until the metering rate which is maintained for continuous operation of the reactor has been reached will hereinafter also be referred to as metering ramp.

The present invention accordingly provides a process for the continuous preparation of polyether alcohols by reaction of alkylene oxides with H-functional starter substances in the presence of DMC catalysts, which comprises, at the beginning of the process
a) firstly placing initial charge material and DMC catalyst in a reactor,
b) metering in alkylene oxides so that the metering rate which is maintained for continuous operation of the reactor is reached in a time of from 100 to 3 000 seconds,
c) metering in starter substance during or after step b) so that the metering rate which is maintained for continuous operation of the reactor is reached in a time of from 5 to 500 seconds,
d) after the fill level in the reactor which is desired for continuous operation of the reactor has been reached, taking product off continuously from the reactor while at the same time metering in starter substance and alkylene oxides in such an amount that the fill level in the reactor remains constant and metering in DMC catalyst so that the catalyst concentration necessary for continuous operation of the reactor is maintained in the reactor.

In a further embodiment, it is also possible to meter-in starter substance and alkylene oxides in parallel. In this case, the same relative metering ramp is used for both streams, i.e. the ratio of the two metered addition streams is constant.

Furthermore, it is also possible to commence metered addition of the starter substance before the maximum metering rate of the alkylene oxides has been reached.

The operating state of the reactor in continuous operation will hereinafter also be referred to as steady state. A characteristic of the steady state is that the process parameters such as pressure and temperature and also the product properties no longer change with time.

Initial charge materials which can be used in step a) are inert solvents or preferably H-functional compounds. Preferred H-functional compounds are monofunctional or polyfunctional alcohols. In one embodiment of the process of the present invention, the starter substances used in step c) can be employed. Preference is given to using polyfunctional reaction products of alcohols with alkylene oxides having a molecular weight of greater than 300 g/mol. In a particularly preferred embodiment of the process of the present invention, the polyether alcohol which is the end product of the process is used as initial charge material.

As starter substances, preference is given to using monofunctional or polyfunctional alcohols having a molecular weight of from 62 to 400 g/mol. These can be the same compounds as the initial charge material or be compounds different from this. Preference is given to using glycerol, sorbitol, ethylene glycol, diethylene glycol, propylene glycol, dipropylene glycol and their reaction products with alkylene oxides.

As alkylene oxides, preference is given to using propylene oxide, butylene oxide, ethylene oxide and mixtures of at least two of the alkylene oxides mentioned. Particular preference is given to using propylene oxide or mixtures of propylene oxide and ethylene oxide.

When the times to reach the metering rates in steps b) and c) are less than those specified, damage to the catalyst occurs, probably because of the high temperatures caused by the rapid metered addition and consequently spontaneous reaction of the propylene oxide. When the times specified are exceeded, it takes a long time for conditions in the reactor under which the target product is produced in a consistent quality to be reached, so that out-of-specification product is obtained in the start-up phase. The time until constant conditions have been reached in the reactor is usually reported as the number of residence times required to reach steady-state operation. The residence time is the quotient of reaction volume (l) and feed rate (in l/s). The residence time thus corresponds to the mean time for which the molecules are present in the reactor. In the case of reactions in which the volume does not remain constant, the residence time is based on the conditions at the inlet of the reactor.

In the initial charging of initial charge material and DMC catalyst in step a), the reactor is preferably filled to a fill level of from 20 to 80%. After a fill level of 100% has been reached in the reactor during steps b) and c), the discharge facility is opened and the fill level in the reactor is kept constant. The catalyst concentration is kept constant by metering in further DMC catalysts, preferably in the form of a suspension, in particular in a polyol.

After the metering rates of the alkylene oxide and the starter substance selected for steady-state operation have been reached, these are usually not altered any more. The ratio of the two metering rates of starter and alkylene oxide determines the molar mass of the finished polyetherol. A change in this ratio during steady-state operation of the reactor can lead to variations in product properties. A simultaneous increase in the two metering rates at a constant ratio of the two streams is possible in principle.

Since the discharge of polyether alcohol from the reactor also results in catalyst being discharged, the catalyst has to be replaced. This is achieved by adding catalyst in parallel to the metered-in starter and the alkylene oxide. The catalyst can be added continuously or in portions. The catalyst can be added in solid form or as a dispersion in the initial charge material used in step a). A further possibility is to disperse the catalyst in the end product. Owing to the differential catalysis observed in the DMC-catalyzed preparation of polyols, a narrow molar mass distribution in the end product is achieved. In principle, the catalyst can be added as a dispersion in any H-acid or inert solvent. It is possible to disperse the catalyst in any propoxylate which has a lower molar mass than the target molar mass, as long as the same starter functionality is retained; it is therefore possible to use masterbatch catalyst suspensions by means of which many different products can be synthesized. For typical flexible foam applications, the use of a glycerol propoxylate having a molar mass of 1 000 g/mol is appropriate. For the preparation of diols, the catalyst will be dispersed in, for example, a propoxylate of dipropylene glycol having a molar mass of 1 000 g/mol. It is also possible to split the stream of catalyst fed in. In this case, each substream is metered in at the beginning as described in point c). In a particular variant of this embodiment, not all substreams of the starter substance contain catalyst; in a preferred variant, only one substream of the starter substance contains catalyst. This embodiment is particularly advantageous when only an increase in molar mass is to be achieved without the simultaneous addition of low molecular weight starters. In the introduction of the catalyst into the reactor, it is not necessary for the catalyst to be activated beforehand. Activation occurs in situ in the reactor under the conditions of steady-state operation.

The concentration of DMC catalyst at the beginning of the reaction is usually in the range from 50 to 500 ppm. During steady-state operation of the reactor, the catalyst concentration in the reactor should be regulated so that the content of free alkylene oxide in the reactor is less than 10% by weight, based on the contents of the reactor. If this amount is exceeded, secondary reactions can occur to an increased extent. These result, in particular, in an increased content of very high molecular weight components in the polyether alcohol and in an increased viscosity. These high molecular weight components lead to a drastic deterioration in the processing properties of the polyether alcohols in the production of foams, and can result in them being completely unusable. If the content of catalyst in the system is too high, the production costs increase.

As described above, the catalyst is suspended in the end product in a preferred embodiment of the invention. The amount of end product to be metered in with the catalyst or separately can be chosen at will. For example, it is possible to dilute the reacting mixture comprising alkylene oxide, DMC catalyst and starter with any amount of end product which, owing to the occurrence of differential catalysis, is inert in the present reaction. However, a high degree of dilution leads to a reduction in the space-time yield, since in the end product is merely circulated. The space-time yield is defined as mass of product per unit time and reactor volume.

In a preferred embodiment of the process of the present invention, the starter is heated to from 50 to 130° C., preferably to the reaction temperature, before being metered into the reactor. This heating becomes more advantageous, the lower the homogenization of the reaction mixture in the reactor and the larger the reactor. Heating of the starter is particularly advantageous when using glycerol, sorbitol, diethylene glycol and dipropylene glycol as starter substances. In this embodiment of the process of the present invention, the formation of primary hydroxyl groups at the end of the chain, which is undesirable for many applications of the polyether alcohols, in particular the production of slabstock foams, is suppressed. In addition, deactivation of the catalyst is suppressed.

As reactor, it is possible to use the customary and known continuously operated reactors. These are, in particular, flow reactors such as loop venturi reactors, for example as described in EP 419 419, or flow reactors having internal heat exchangers, as described in WO 01/62826. Furthermore, it is possible to use jet-loop reactors having internal or external heat exchangers, as described in PCT/EP01/02033.

Particular preference is given to using continuously operated stirred vessels, as described, for example, in WO 01/62825. The inflow and the outflow of the products are preferably regulated by means of pumps in this embodiment.

The multimetal cyanide compounds used for preparing the polyether alcohols employed according to the present invention are known. They usually have the formula (I)

$$M^1_a[M^2(CN)_b(A)_c]_d \cdot fM^1gX_n \cdot h(H_2O) \cdot eL, \quad (I)$$

where $M^1$ is a metal ion selected from the group consisting of $Zn^{2+}$, $Fe^{2+}$, $Co^{3+}$, $Ni^{2+}$, $Mn^{2+}$, $Co^{2+}$, $Sn^{2+}$, $Pb^{2+}$, $Mo^{4+}$, $Mo^{6+}$, $Al^{3+}$, $V^{4+}$, $V^{5+}$, $Sr^{2+}$, $W^{4+}$, $W^{6+}$, $Cr^{2+}$, $Cr^{3+}$, $Cd^{2+}$, $Hg^{2+}$, $Pd^{2+}$, $Pt^{2+}$, $V^{2+}$, $Mg^{2+}$, $Ca^{2+}$, $Ba^{2+}$, $Cu^{2+}$, $M^2$ is a metal ion selected from the group consisting of $Fe^{2+}$, $Fe^{3+}$, $Co^{2+}$, $Co^{3+}$, $Mn^{2+}$, $Mn^{3+}$, $V^{4+}$, $V^{5+}$, $Cr^{2+}$, $Cr^{3+}$, $Rh^{3+}$, $Ru^{2+}$, $Ir^{3+}$ and $M^1$ and $M^2$ are identical or different.

A is an anion selected from the group consisting of halide, hydroxide, sulfate, carbonate, cyanide, thiocyanate, isocyanate, cyanate, carboxylate, oxalate and nitrate, X is an anion selected from the group consisting of halide, hydroxide, sulfate, carbonate, cyanide, thiocyanate, isocyanate, cyanate, carboxylate, oxalate and nitrate, L is a water-miscible ligand selected from the group consisting of alkyls, aldehydes, ketones, ethers, polyethers, esters, ureas, amides, nitriles, lactones, lactams and sulfides, and a, b, c, d, g and n are chosen so that the compound is electrically neutral, and e is the coordination number of the ligand or 0, f is a fraction or integer greater than or equal to 0, and h is a fraction or integer greater than or equal to 0.

These compounds are prepared by means of generally known methods by combining the aqueous solution of a water-soluble metal salt with the aqueous solution of a hexacyanometalate compound, in particular a salt or an acid, hereinafter also referred to as starting solutions, and, if desired, adding a water-soluble ligand thereto during or after the starting solutions have been combined. Such catalysts and their preparation are described, for example, in EP 862,947 and DE 197,42,978.

Particularly advantageous catalysts are multimetal cyanide compounds in whose preparation the corresponding acids are used as cyanometalate compound.

The multimetal cyanide compounds preferably have a crystalline structure. Their particle size is preferably in the range from 0.1 to 100 μm. A particular advantage of crystalline DMC catalysts, in particular ones which have been prepared using cyanometalic acids, is their higher catalytic activity. In this way, the preparation of the polyether alcohols can be carried out using a smaller amount of catalyst. The amount used in this case usually corresponds to the amount of multimetal cyanide compounds in the finished polyether alcohol. The costly separation of the multimetal cyanide compounds from the polyether alcohol after the preparation can thus be dispensed with. However, it is also possible to use a larger amount of multimetal cyanide compounds and to reduce the amount of the multimetal cyanide compound in the polyol after the synthesis of the polyether alcohol to such an extent that the polyether alcohol contains the amount of multimetal cyanide compounds desired for further processing.

The multimetal cyanide compounds are preferably used in the form of suspensions in organic compounds, preferably alcohols. In the process of the present invention, it is possible to disperse the catalyst either in an intermediate or in the end product of the synthesis. The catalyst suspension should have a concentration of from 0.5 to 10%.

The polyether alcohols are prepared, as indicated above, by adding alkylene oxides onto H-functional starter substances in the presence of the catalysts described.

Low molecular weight starter substances used are H-functional compounds. In particular, alcohols having a functionality of from 1 to 8, preferably from 2 to 8, are used. To prepare polyether alcohols used for flexible polyurethane foams, starter substances used are, in particular, alcohols having a functionality of from 2 to 4, in particular 2 or 3. Examples are ethylene glycol, propylene glycol, glycerol, trimethylolpropane, pentaerythritol. In the addition reaction of alkylene oxides by means of DMC catalysts, it is advantageous to use the reaction products of the alcohols mentioned with alkylene oxides, in particular propylene oxide, together with or in place of the respective alcohols. Such compounds preferably have a molar mass up to 500 g/mol. The addition reaction of the alkylene oxides in the preparation of these reaction products can be carried out using any catalysts, for example basic or Lewis-acid catalysts; basic catalysts are separated off by appropriate methods (e.g. crystallization or adsorption) after the synthesis. The polyether alcohols for the production of flexible polyurethane foams usually have a hydroxyl number in the range from 20 to 100 mg KOH/g.

The addition reaction of the alkylene oxides in the preparation of the polyether alcohols used for the process of the present invention can be carried out by known methods. Thus, it is possible for the polyether alcohols to contain only one alkylene oxide. When using a plurality of alkylene oxides, it is possible for them to be added on in blocks by introducing the alkylene oxides individually in succession or to be added on randomly by introducing the alkylene oxides together. It is also possible to incorporate both blocks and random sections into the polyether chain in the preparation of the polyether alcohols.

In the preparation of flexible polyurethane slabstock foams, preference is given to using polyether alcohols having a high content of secondary hydroxyl groups and a content of ethylene oxide units in the polyether chain of not more than 30% by weight, based on the weight of the polyether alcohol. These polyether alcohols preferably have a propylene oxide block at the end of the chain. For the preparation of flexible polyurethane molded foams, use is made of, in particular, polyether alcohols having a high content of primary hydroxyl groups and an ethylene oxide end block in an amount of <20% by weight, based on the weight of the polyether alcohol.

The addition reaction of the alkylene oxides is carried out under the conditions customary for this purpose, at temperatures in the range from 60 to 180° C., preferably from 90 to 150° C., in particular from 100 to 140° C., and pressures in the range from 0 to 20 bar, preferably in the range from 0 to 10 bar and in particular in the range from 0 to 5 bar. The mixture of starter substance/dispersing polyol and DMC catalyst can, according to the teachings of WO 98/52689, be pretreated by stripping before commencement of the alkoxylation.

After the addition reaction of the alkylene oxides is complete, the polyether alcohol is worked up by means of customary methods by removing the unreacted alkylene oxides and volatile constituents, usually by distillation, steam stripping or gas stripping and/or other deodorization methods. If necessary, a filtration can be carried out.

The DMC catalyst can remain in the polyether alcohol. When the amount of DMC catalyst used in the preparation of the polyether alcohols is too high, the excess can be removed from the polyether alcohol after the reaction. This can be carried out using the customary and known methods of purification of polyether alcohols, for example filtration, which may be in the form of a deep bed filtration or a membrane filtration, or sedimentation, for example by means of centrifugation.

The polyether alcohols prepared in this way are, as described above, preferably used as starting materials for the production of flexible polyurethane foams.

The invention is illustrated by the following examples.

EXAMPLE 1.1 (Comparison)

A reactor having a total capacity of 1.3 liters and equipped with an anchor stirrer and jacket cooling was used. The temperature was regulated via a water circuit, with the reactor temperature being measured at the bottom of the reactor. HPLC pumps were used for metering in alkylene oxides, starter and DMC suspension. The concentration of free propylene oxide was measured using an IR-ATR probe from Mettler-Toledo (ReactIR) which had previously been calibrated for the present system. The absolute deviations in the determination of the concentration of free propylene oxide were about ±1%.

The reactor was firstly charged with 500 g of a propoxylate of dipropylene glycol having a mean molar mass of 1 000 g/mol in which 200 ppm of DMC catalyst according to the teachings of the patent EP 862 947, prepared as moist filter cake with subsequent drying to constant mass at 100° C. and 13 mbar, were dispersed. The reactor was heated to 115° C. and at the same time the stirrer was switched on, with the stirrer speed being chosen so that an energy input of 2.0 kW/m$^3$ was achieved during the entire reaction time. Propylene oxide, further propoxylate of dipropylene glycol which had a molar mass of 1 000 g/mol and functioned as starter in the present case, and DMC catalyst suspension (DMC concentration: 5 000 ppm in a propoxylate having a molar mass of 1 000 g/mol) were subsequently metered in simultaneously. The metering rate of the propylene oxide was increased from 0 to 7.5 g/min over 5 s; the metering rate of the propoxylate of dipropylene glycol was increased from 0 to 2.3 g/min over 5 s and that of the catalyst suspension was increased from 0 to 0.2 g/min over 5 s. After 1 000 g of product were present in the reactor, as indicated by monitoring via the weighing signals of the starting materials metered in, the product discharge valve was opened and a stream of 10 g/min was taken off in a controlled fashion. The mean residence time in the reactor system was accordingly (1 000 ml/10 ml/min)=100 min on the assumption of a density of the reaction mixture of 1 g/ml.

In this example, an increase in the molar mass from 1 000 to 4 000 g/mol was achieved. It was observed that large temperature peaks up to 150° C. occur during the reaction, and severe regulation fluctuations likewise occurred. Concentrations of free propylene oxide of up to 25% were reached in the reactor.

Samples were taken from the product stream every 100 minutes for a period of 2 500 minutes (=41 h). The mean OH number of the products was 28.84 mg KOH/g, corresponding to a molecular weight of about 4 000 g/mol. After 20 residence times (i.e. 33 h), the product viscosity was largely constant and was in the range from 813 to 835 mPas at 25° C.

It may be assumed that the causes of the high viscosity are damage to the catalyst due to the temperature peaks and also the difficulty of regulating this system. Since the unruly reaction still occurred after 20 residence times, permanent damage occurred even to the freshly introduced catalyst, presumably because of the temperature fluctuations.

EXAMPLE 1.2 (Comparison)

The procedure of example 1.1 was repeated, but the time to reach the metering rate for propylene oxide, propoxylate of dipropylene glycol and catalyst was in each case 7 200 seconds.

The maximum temperature was 116° C.

The concentration of free propylene oxide in the reactor was less than 1%, determined by means of ATR-IR measurements.

Samples were taken from the product stream every 100 minutes for a period of 2 500 minutes. The mean OH number of the products after 22 residence times was 28.21 mg KOH/g, corresponding to a molecular weight of about 4 000 g/mol. The samples taken after more than 18 residence times had a largely constant product viscosity of about 820±7 mPas at 25° C.

The cause for the long time taken to reach a steady state may be assumed to be the excessively slow activation of the catalyst present at the beginning. It therefore took a long time to reach the required activity.

EXAMPLE 1.3 (According to the Present Invention)

The procedure of example 1.1 was repeated, but the time to reach the metering rate for propylene oxide, propoxylate of dipropylene glycol and catalyst was in each case 500 seconds.

Samples were taken from the product stream every 10 minutes for a period of 1 000 minutes. The mean OH number of the products after 10 residence times was 28.95 mg KOH/g, corresponding to a molecular weight of about 4 000 g/mol. After 5 residence times, the product viscosity was largely constant and was 818±8 mPas at 25° C.

This example shows that the metering ramp according to the present invention enables the steady state to be reached quickly (after 500 minutes), so that economical operation can be achieved.

EXAMPLE 1.4 (Comparison)

A reactor as in example 1.1 which was additionally provided with metered introduction of monomeric dipropylene glycol by means of HPLC pumps was used. The reactor was initially charged with 500 g of a propoxylate of dipropylene glycol having a mean molar mass of 2 000 g/mol in which 300 ppm of DMC catalyst was dispersed. The catalyst was prepared according to the teachings of EP 862 947. After heating to 115° C. and setting the stirrer power to 2.0 kW/m$^3$, propylene oxide (metering: from 0 to 4.67 g/min in 5 s), dipropylene glycol (metering: from 0 to 0.33 g/min in 5 s), propoxylate of dipropylene glycol having a molar mass of 2 000 g/mol (metering: from 0 to 4.7 g/min in 5 s) and DMC suspension (concentration: 5 000 ppm, dispersed in a propoxylate of dipropylene glycol having a molar mass of 2 000 g/mol, metering: from 0 to 0.3 g/min in 5 s) were metered in simultaneously. After 1 000 g of reaction mixture were present in the reactor, the discharge valve was opened and product was taken off at a rate of 10 g/min.

An unruly reaction associated with strong temperature pulses and temporary cessation of the reaction was observed. Steady-state operation was not achieved.

Samples were taken from the product stream every 100 minutes up to a reaction time of 3 000 minutes. The mean OH number of the products was 56.4 mg KOH/g, corresponding to a molecular weight of about 2 000 g/mol. After 25 residence times, the product viscosity was largely constant and was in the range from 324 to 344 mPas at 25° C.

EXAMPLE 1.5 (Comparison)

The procedure of example 1.3 was repeated, but the time to reach the metering rate for propylene oxide, dipropylene glycol, propoxylate of dipropylene glycol and catalyst was in each case 8 000 seconds.

Samples were taken from the product stream every 100 minutes up to a reaction time of 2 500 minutes. The mean OH number of the products after 24 residence times was 55.2 mg KOH/g. After 23 residence times, the product viscosity was largely constant and was 333±11 mPas at 25° C.

EXAMPLE 1.6 (According to the Present Invention)

The procedure of example 1.5 was repeated, but the time to reach the metering rate for propylene oxide, dipropylene glycol, propoxylate of dipropylene glycol and catalyst was in each case 400 seconds.

Samples were taken from the product stream up to a reaction time of 1 500 minutes. The mean OH number of the products after 10 residence times was 54.8 mg KOH/g. After 6 residence times, the product viscosity was largely constant and was 331±8 mPas at 25° C.

We claim:

1. A process for the continuous preparation of polyether alcohols by reaction of alkylene oxides with H-functional starter substances in the presence of DMC catalysts, which comprises, at the beginning of the process
   a) firstly placing initial charge material and DMC catalyst in a reactor,
   b) metering in alkylene oxide so that the metering rate which is maintained for continuous operation of the reactor is reached in a time of from 100 to 3 000 seconds,
   c) metering in starter substance during or after step b) so that the metering rate which is maintained for continuous operation of the reactor is reached in a time of from 5 to 500 seconds,
   d) after the fill level in the reactor which is desired for continuous operation of the reactor has been reached, taking product off continuously from the reactor while at the same time metering in starter substance and alkylene oxides in such an amount that the fill level in the reactor remains constant and metering in DMC catalyst so that the catalyst concentration necessary for continuous operation of the reactor is maintained in the reactor.

2. A process as claimed in claim 1, wherein inert solvents or H-functional compounds are used as initial charge material.

3. A process as claimed in claim 1, wherein monofunctional or polyfunctional alcohols are used as initial charge material.

4. A process as claimed in claim 1, wherein polyfunctional reaction products of alcohols with alkylene oxides having a molecular weight of greater than 300 g/mol are used as initial charge material.

5. A process as claimed in claim 1, wherein the polyether alcohol which is the end product of the process is used as initial charge material.

6. A process as claimed in claim 1, wherein monofunctional or polyfunctional alcohols having a molecular weight of from 62 to 400 g/mol are used as starter substance.

7. A process as claimed in claim 1, wherein propylene oxide, butylene oxide, ethylene oxide or a mixture of at least two of the alkylene oxides mentioned is used as alkylene oxide.

8. A process as claimed in claim 1, wherein propylene oxide or a mixture of propylene oxide and ethylene oxide is used as alkylene oxide.

9. A process as claimed in claim 1, wherein the low molecular weight starter is heated to from 50 to 130° C. before being metered into the reactor.

10. A process as claimed in claim 1, wherein the reactor is filled to a fill level of from 20 to 80% in step a).

11. A process as claimed in claim 1, wherein the concentration of the DMC catalyst at the beginning of the reaction is in the range from 50 to 500 ppm.

* * * * *